US012043913B2

(12) United States Patent
Brun et al.

(10) Patent No.: US 12,043,913 B2
(45) **Date of Patent: *Jul. 23, 2024**

(54) HANDLING DEVICE TO BE USED TO CONVEY AN INTERVENTION TOOL ON AN ELECTROLYTIC CELL

(71) Applicant: RIO TINTO ALCAN INTERNATIONAL LIMITED, Montréal (CA)

(72) Inventors: Frédéric Brun, Chicoutimi (CA); Steeve Renaudier, Saint Pierre D'Albigny (FR)

(73) Assignee: RIO TINTO ALCAN INTERNATIONAL LIMITED, Montreal (CA)

( * ) Notice: Subject to any disclaimer, the term of this patent is extended or adjusted under 35 U.S.C. 154(b) by 402 days.

This patent is subject to a terminal disclaimer.

(21) Appl. No.: 17/433,674

(22) PCT Filed: Mar. 11, 2020

(86) PCT No.: PCT/CA2020/050325
§ 371 (c)(1),
(2) Date: Aug. 25, 2021

(87) PCT Pub. No.: WO2020/181380
PCT Pub. Date: Sep. 17, 2020

(65) Prior Publication Data

US 2022/0090280 A1 Mar. 24, 2022

(30) Foreign Application Priority Data

Mar. 14, 2019 (FR) ..................................... 19/02640

(51) Int. Cl.
*C25C 7/06* (2006.01)
*B66C 17/06* (2006.01)
*C25C 3/10* (2006.01)

(52) U.S. Cl.
CPC ................ *C25C 7/06* (2013.01); *B66C 17/06* (2013.01); *C25C 3/10* (2013.01)

(58) Field of Classification Search
CPC ............................................... C25C 3/06–3/24
See application file for complete search history.

(56) References Cited

U.S. PATENT DOCUMENTS 3,627,670 A * 12/1971 Duclaux .................. C25C 3/16 204/297.14
4,032,020 A * 6/1977 Kato ......................... C25C 3/06 294/82.35

(Continued)

FOREIGN PATENT DOCUMENTS

CN 104746103 A * 7/2015 ............... C25C 3/12
DE 2413763 A1 10/1975

(Continued)

OTHER PUBLICATIONS

Machine translation of Huon (EP 1217100 A1) (Year: 2002).*
Machine translation of Wang (CN 104746103 A) (Year: 2015).*

*Primary Examiner* — Harry D Wilkins, III
(74) *Attorney, Agent, or Firm* — NORTON ROSE FULBRIGHT CANADA LLP

(57) ABSTRACT

This handling device comprises a chassis carrying the intervention tool, and a means of displacement allowing movement of the chassis, in particular along the superstructure of the electrolytic cell. The means of displacement is adapted to rest against the superstructure.

21 Claims, 7 Drawing Sheets

(56) References Cited

U.S. PATENT DOCUMENTS

| | | | | | |
|---|---|---|---|---|---|
| 4,053,384 | A | | 10/1977 | Siegmund | |
| 4,210,513 | A | * | 7/1980 | Mutschler | C25C 3/20 204/245 |
| 4,414,070 | A | * | 11/1983 | Spence | C25C 3/20 204/225 |
| 4,436,607 | A | * | 3/1984 | Fischer | C25C 3/10 204/279 |
| 4,465,578 | A | * | 8/1984 | Duclaux | C25C 3/10 204/288.4 |
| 5,294,318 | A | | 3/1994 | Grant, Jr. et al. | |
| 6,153,066 | A | * | 11/2000 | Piron | C07C 219/06 204/245 |
| 2004/0211663 | A1 | * | 10/2004 | Gagne | C25C 7/06 204/280 |
| 2006/0049054 | A1 | * | 3/2006 | Van Acker | C25C 3/06 205/81 |
| 2006/0290153 | A1 | * | 12/2006 | Delescluse | B66C 1/62 294/115 |
| 2010/0116653 | A1 | * | 5/2010 | Van Acker | B66C 1/28 204/297.01 |
| 2013/0181468 | A1 | * | 7/2013 | David | B66C 1/42 294/197 |
| 2014/0231268 | A1 | | 8/2014 | David | |
| 2022/0136120 | A1 | * | 5/2022 | Renaudier | C25C 3/10 204/275.1 |

FOREIGN PATENT DOCUMENTS

| | | | | | |
|---|---|---|---|---|---|
| EP | 1028084 | A1 | | 8/2000 | |
| EP | 1217100 | A1 | * | 6/2002 | C25C 3/10 |
| FR | 1526766 | A | | 5/1968 | |
| FR | 2514790 | A1 | | 4/1983 | |
| FR | 2517704 | A1 | | 6/1983 | |
| FR | 2582677 | A1 | | 12/1986 | |
| FR | 2874934 | A1 | | 3/2006 | |
| FR | 2980488 | A1 | | 3/2013 | |
| GB | 992830 | A | | 5/1965 | |
| WO | WO2016128661 | A1 | | 8/2016 | |
| WO | WO-2019025891 | A1 | * | 2/2019 | C25C 3/10 |

* cited by examiner

[Fig. 1]
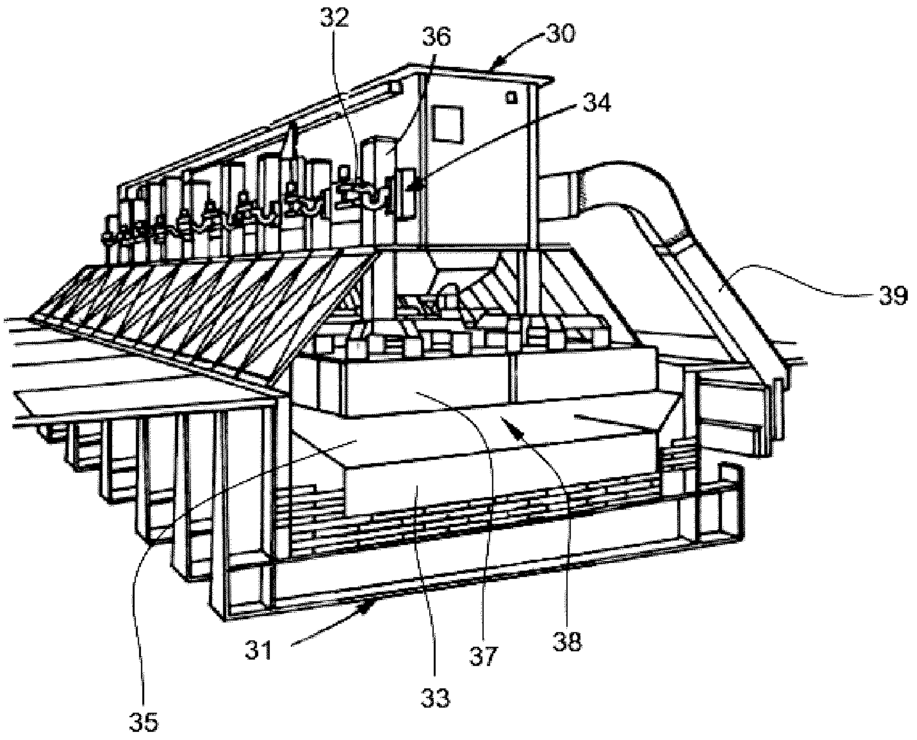
[Fig. 2]
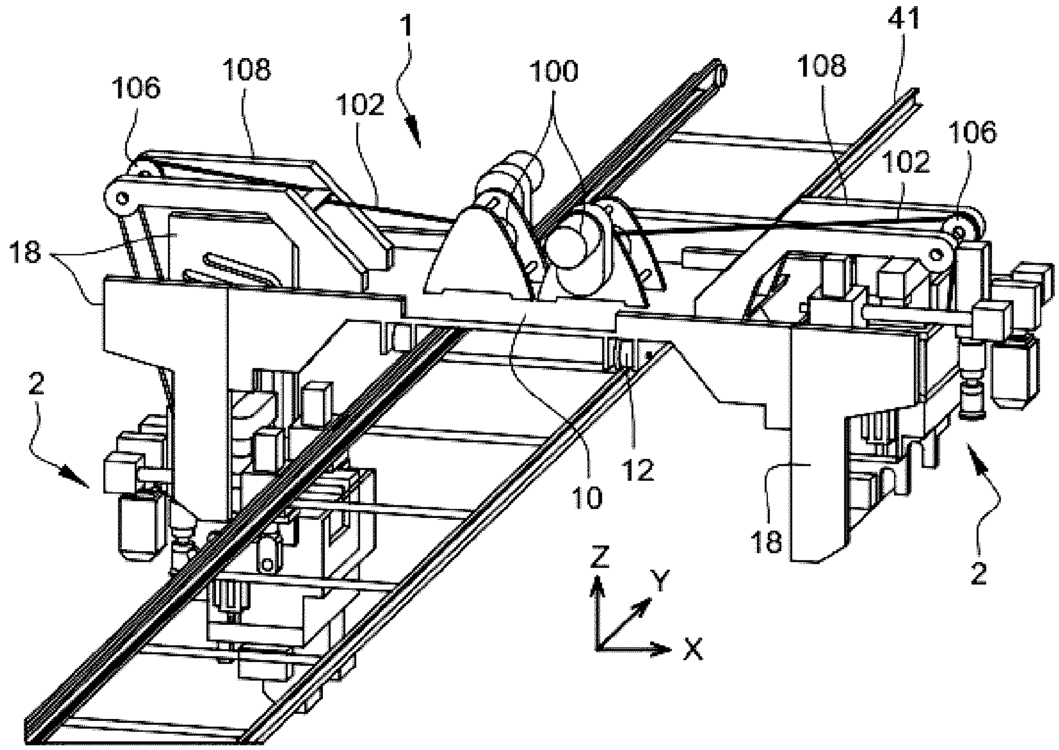

[Fig. 3]
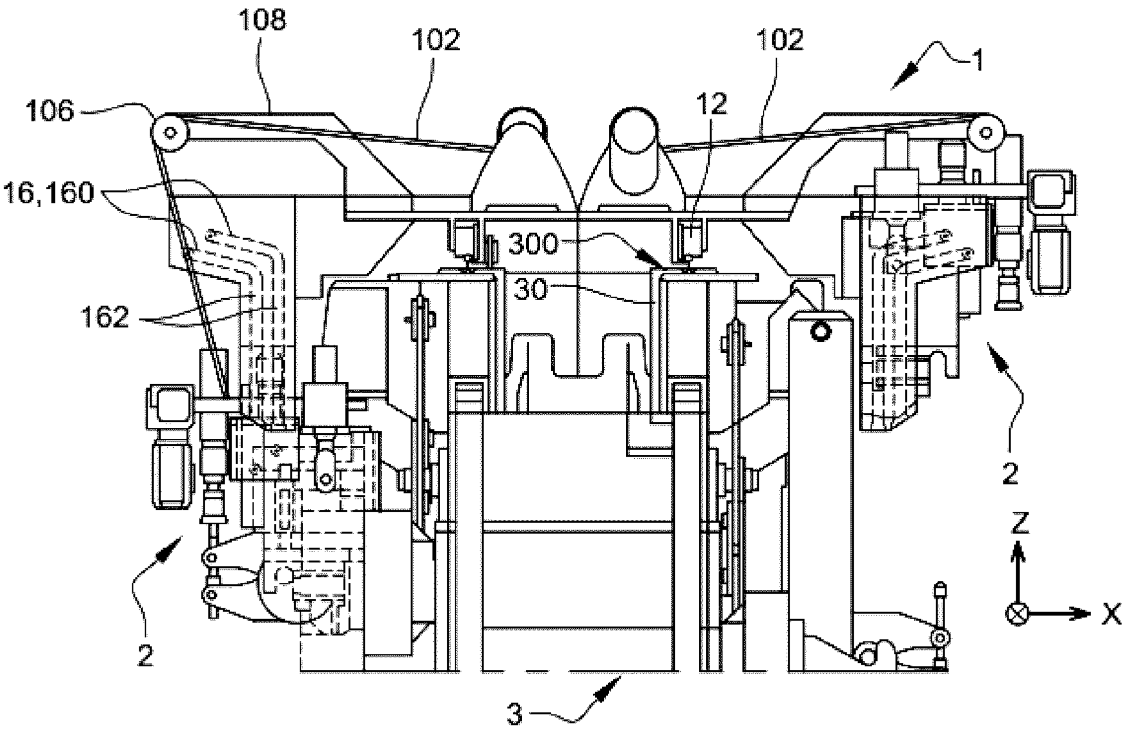
[Fig. 4]
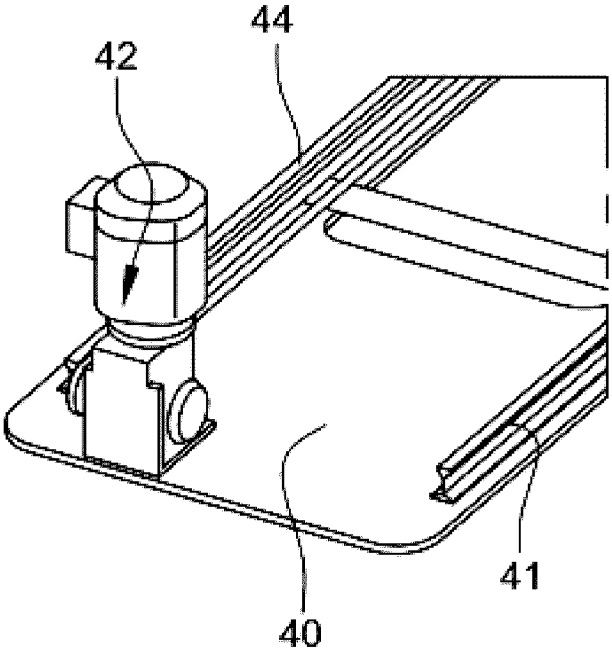

[Fig. 5]
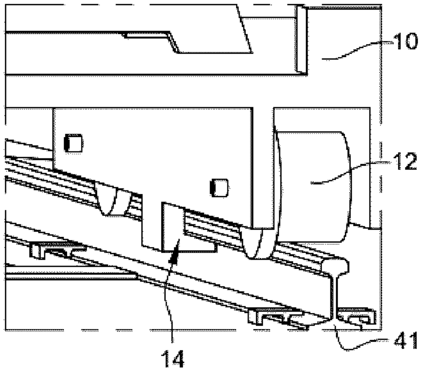
[Fig. 6]
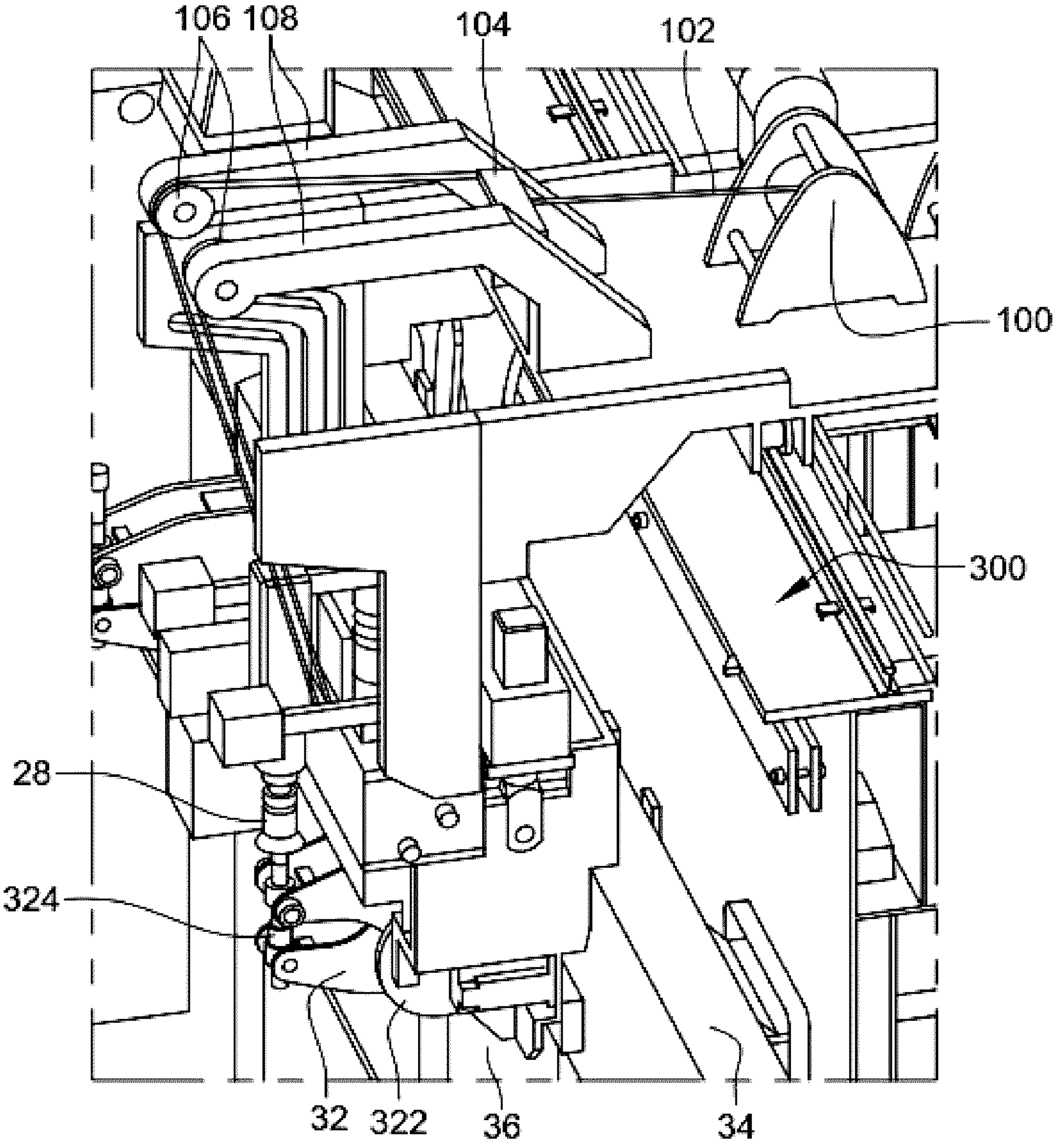

[Fig. 7]
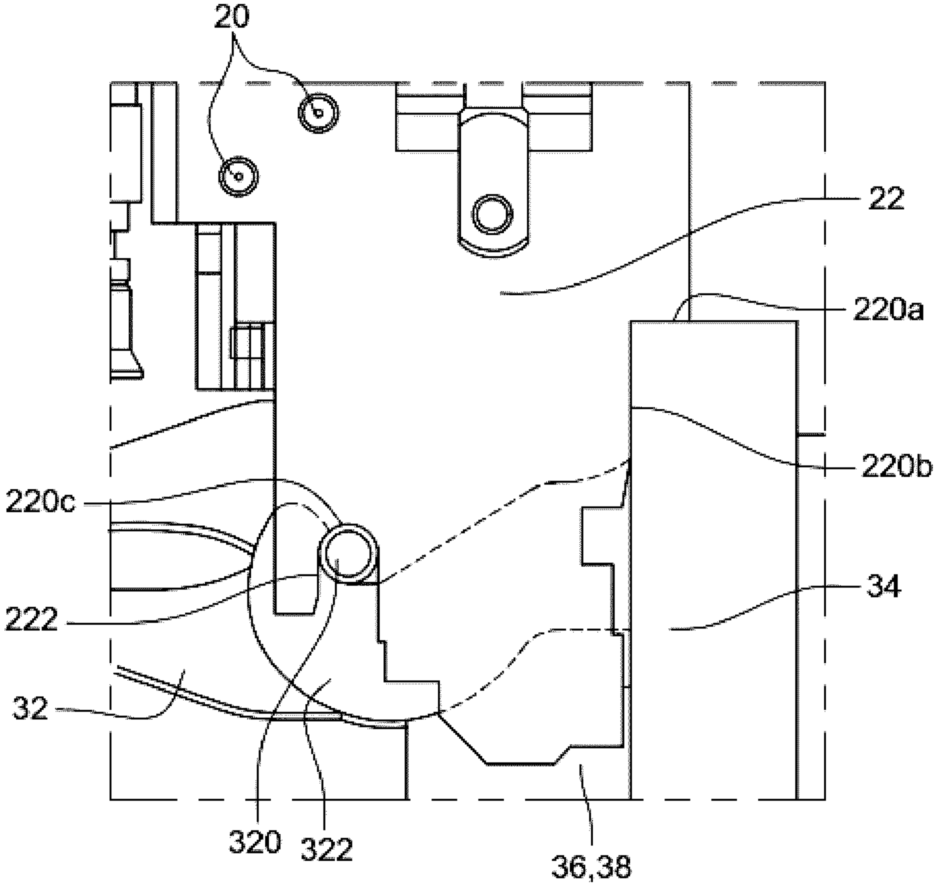
[Fig. 8]
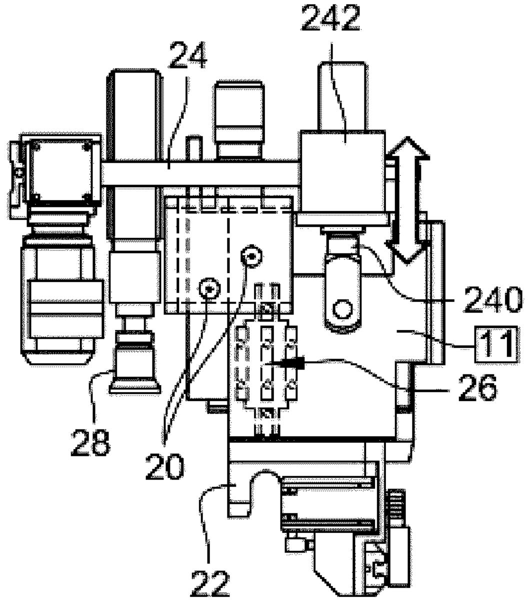

[Fig. 9]
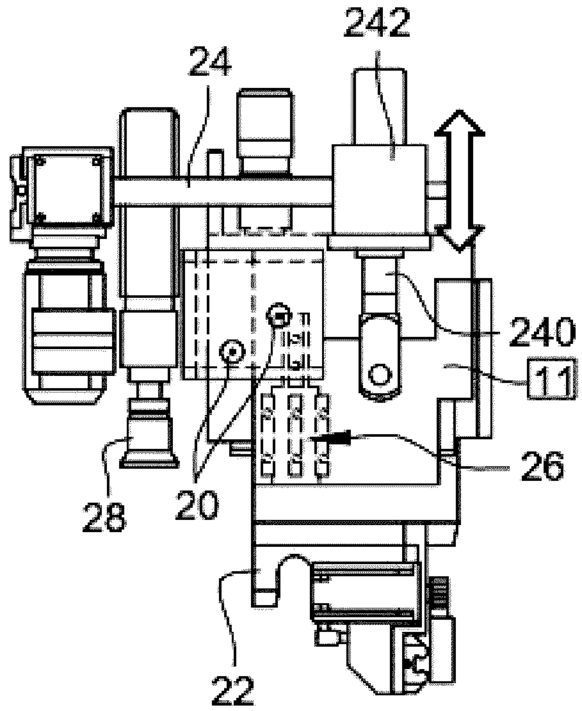
[Fig. 10]
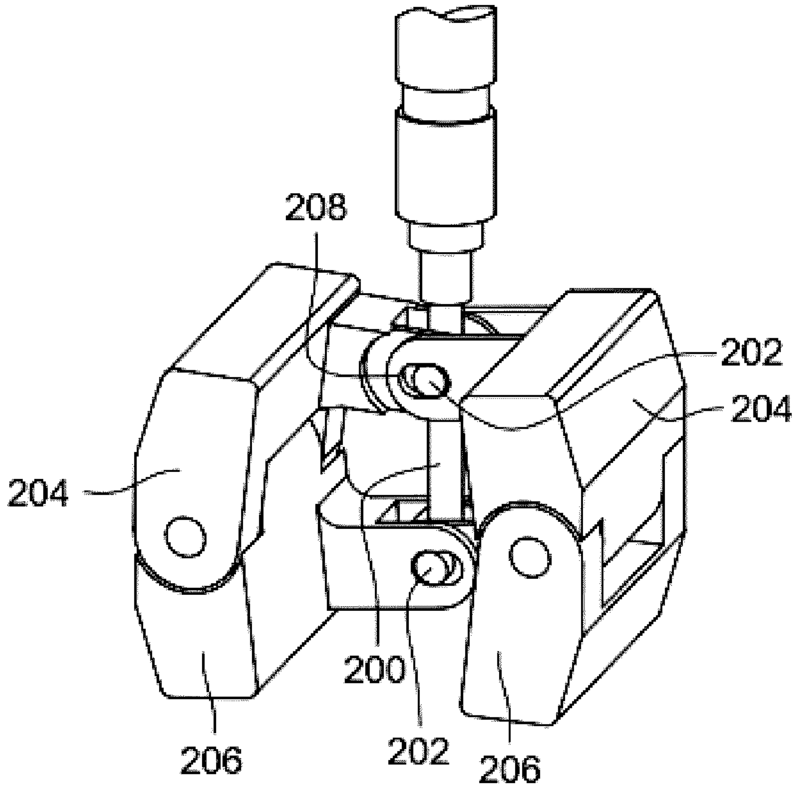

[Fig. 11]
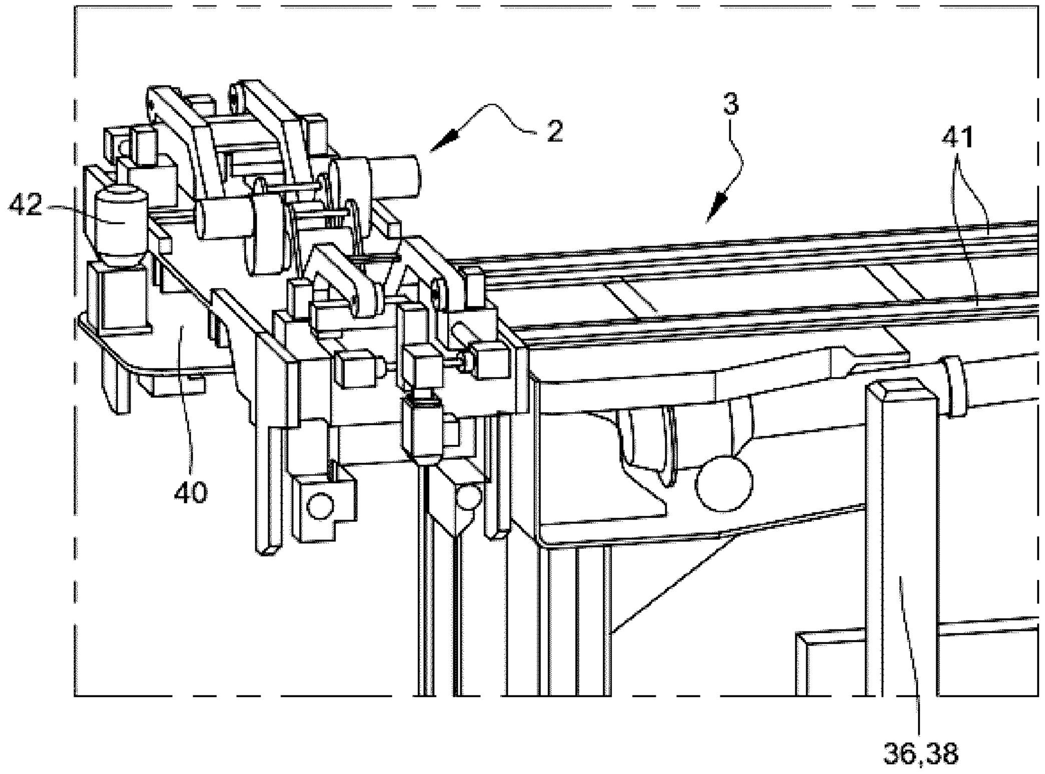
[Fig. 12]
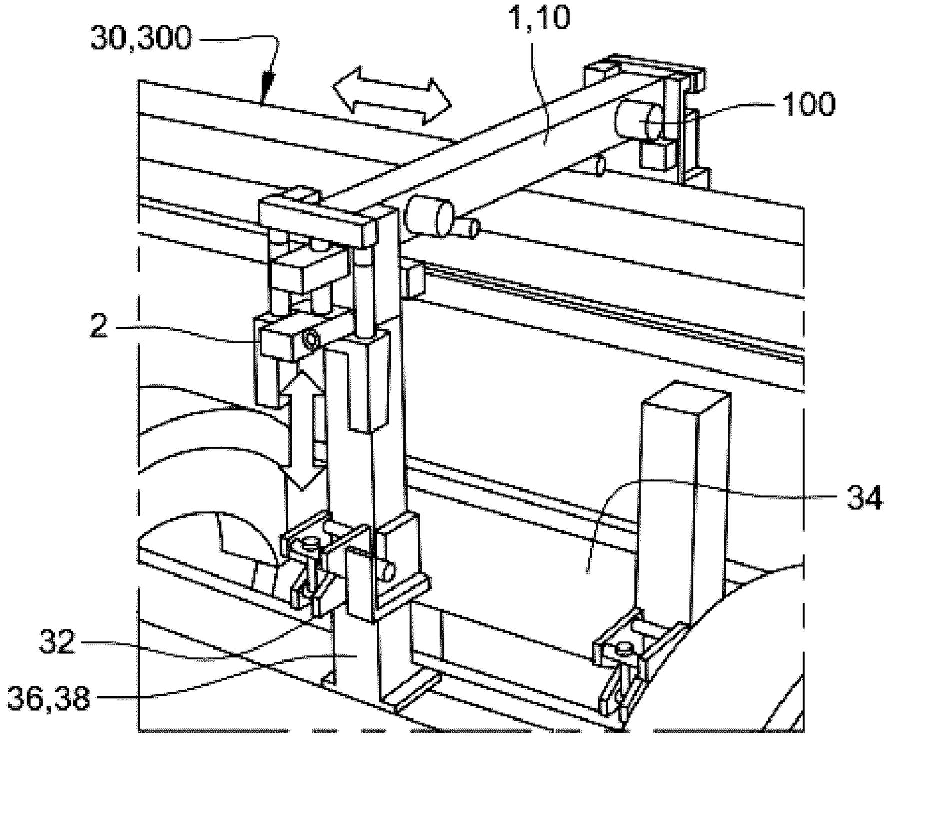

[Fig. 13]
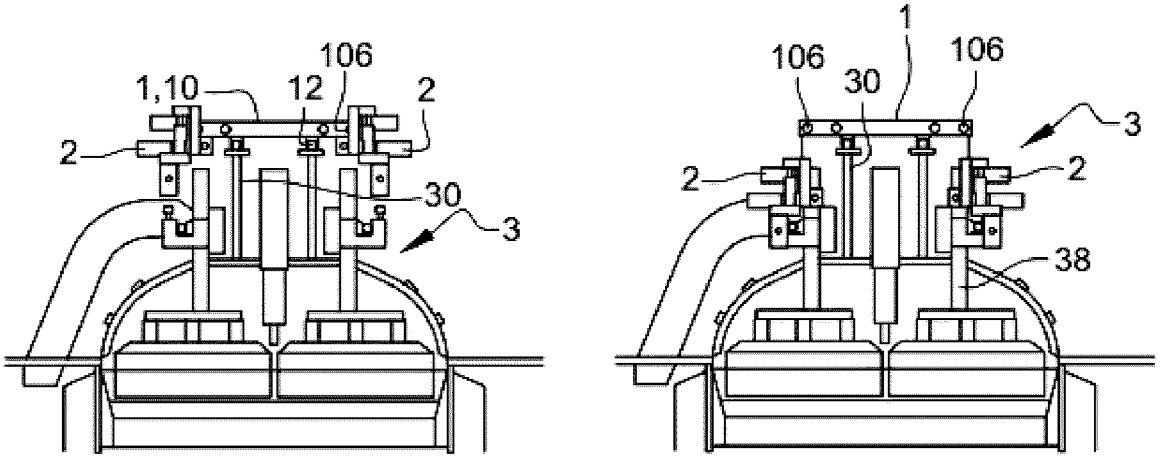
[Fig. 14]
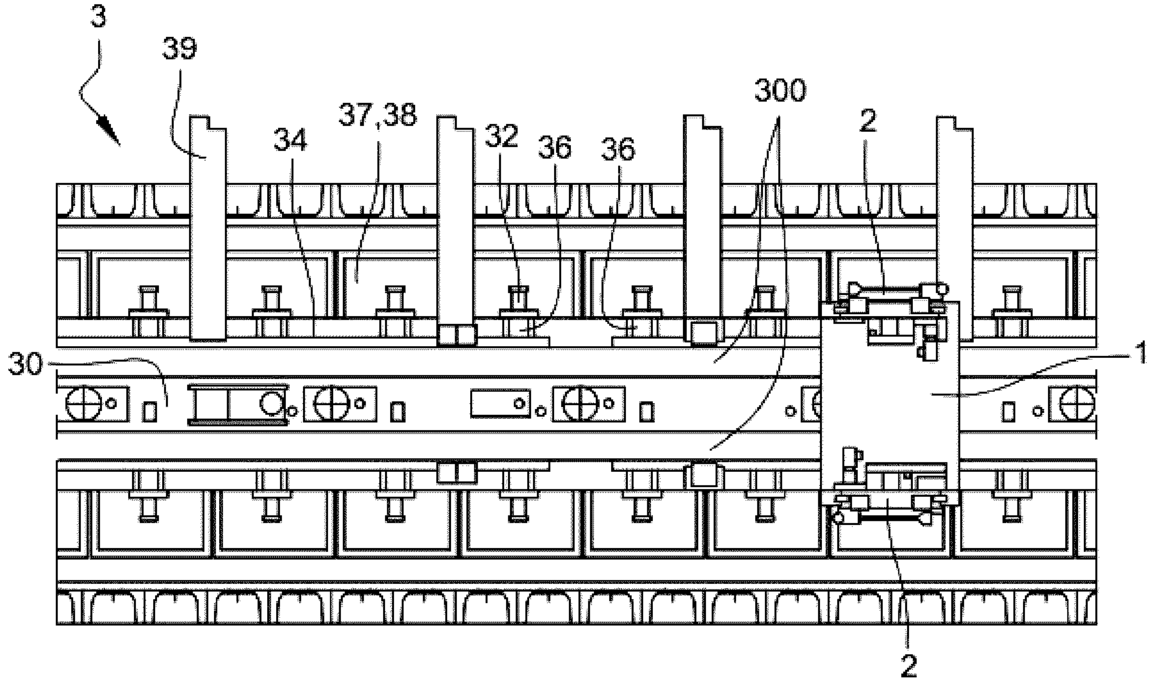

HANDLING DEVICE TO BE USED TO CONVEY AN INTERVENTION TOOL ON AN ELECTROLYTIC CELL

CROSS-REFERENCE TO RELATED APPLICATIONS

This application is a U.S. National Stage application under 35 U.S.C. § 371 of International Application PCT/CA2020/050325 (published as WO2020/181380 A1), filed Mar. 11, 2020, which claims priority to French Patent Application No. FR 19/02640, filed Mar. 14, 2019, and the present application claims priority to and the benefit of both of these prior applications, each of which is incorporated by reference in its entirety.

The present invention relates to a handling device designed to be used to convey an intervention tool on an electrolytic cell. The invention also relates to an intervention device on an electrolytic cell comprising this handling device and the intervention tool, an electrolytic cell comprising this handling device, and an aluminum smelter comprising this electrolytic cell. Finally, the invention relates to an intervention method on this electrolytic cell.

Producing aluminum industrially from alumina by electrolysis according to the Hall-Héroult process is well known. To this end, a rectangular electrolytic cell is provided, like that shown in FIG. 1, conventionally comprising a steel pot shell 31 inside which a refractory material coating is laid, a cathode 33 of carbonaceous material, traversed by cathode electrical conductors designed to collect the electrolysis current at cathode 33 to conduct it to cathode outlets passing through the bottom or the sides of the pot shell, and an electrolytic bath 35 in which the alumina is dissolved.

The electrolytic cell comprises several anode assemblies 38, each comprising a substantially vertical anode rod 36 and an anode 37 formed from at least one anode block suspended from the anode rod 36 and immersed in this electrolytic bath 35. The anodes 37 are more particularly of the prebaked anode type with prebaked carbon blocks, i.e. baked before introduction into the electrolytic cell.

The electrolytic cell comprises a superstructure 30 extending above the pot shell 31 to support and guide a vertically movable anode frame 34. This superstructure 30 consists, in particular, of at least one beam extending above the pot shell 31 in a longitudinal direction of the cell and supported by feet arranged at the transverse edges of the pot shell 31. Typically, this superstructure 30 further comprises means for extracting cell gases and devices for supplying alumina. The anode assemblies 38 are suspended at regular intervals along two rows from the anode frame 34 by means of removable connectors 32 pressing the anode rods 36 against the anode frame 34. Electrical conductors 39 for rising the electrolysis current carrying the electrolysis current from the cathode outlets of the preceding electrolytic cell to the anode frame 34 extend diagonally upwards from a longitudinal edge of the pot shell 31.

The anode blocks being consumed as the electrolysis reaction progresses, the anode assemblies 38 are progressively lowered towards the cathode 33 in order to keep the distance between the lower surface of the anodes 37 and the cathode 33 substantially constant.

The displacement of the anode assemblies 38 is collective, since all the anode assemblies 38 attached to the same anode frame 34 are displaced simultaneously due to the displacement of this anode frame 34.

To ensure the correct operation of the electrolytic cell, it is typically necessary for the anode assemblies 38 to be positioned so that the lower surface of their anodes 37 is in a plane of reference, in particular coincident with the plane containing the lower surface of the other anodes 37 of the electrolytic cell, also called the anode plane.

However, as is sometimes the case, some anodes 37 wear out more or less quickly than adjacent anodes 37, slip slightly or are improperly positioned when they are placed in the cell so that their lower face is no longer contained in the anode reference plane, thereby resulting in a problem of electrolytic cell performance or generating detrimental operational problems, for example, a short circuit. The corresponding anode assemblies 38 must advantageously be repositioned so that the lower surface of the anodes 37 is once again located in the anode reference plane. This individualized repositioning of an anode assembly 38 is also called anode height adjustment. The anode frame 34, which collectively supports and displaces a plurality of anode assemblies 38, does not allow such an adjustment to be made.

To overcome this difficulty, equipping each anode assembly 38 with an actuator allowing it to be moved individually is well known. However, this individual motorization solution is relatively expensive, and it is not easy to implement in pre-existing aluminum smelters.

Another known solution is the use of a handling crane circulating in the potroom above the electrolytic cells, also called a pot tending machine, guided by an operator, to reposition an improperly positioned anode assembly. To this end, the electrolysis service machine, circulating in the potroom above the electrolytic cells, includes a screw-driving machine to tighten-loosen the removable connector, working in conjunction with a gripping arm allowing to grip the anode rod, typically by its upper end, and reposition the anode assembly by raising or lowering it. However, the number of electrolysis service machines in an aluminum smelter is limited and these machines are required for multiple operations, so their availability is limited. In addition, electrolysis service machines cannot cross paths in the potroom. Consequently, an electrolysis service machine cannot be used as part of a process for continuous improvement of operations involving regular repositioning of the anode assemblies.

Generally speaking, document FR3024466 discloses a vehicle for the operation of electrolytic cells, which can move from one electrolytic cell to another in order to carry out an intervention therein. However, this vehicle circulates in the aisles used for the movement of other vehicles performing various operations on the cells, or in which pallets are temporarily stored for operations on the cell, in particular to support new or used anode assemblies.

Also, this invention aims to overcome all or part of these drawbacks by proposing a handling device intended to convey an intervention tool making it possible to carry out an intervention on an electrolytic cell, with a view in particular to quickly adjusting the height of the anodes, at contained costs, without obstructing the movement of operators or other vehicles.

To this end, the subject-matter of this invention is a handling device intended to convey an intervention tool, making it possible to carry out an intervention on an electrolytic cell having a superstructure, the handling device comprising a chassis carrying the intervention tool and displacement means adapted to allow movement of the chassis, characterized in that the displacement means is adapted to rest against the superstructure.

Thus, an intervention tool may be brought by the handling device to various locations along the superstructure of the electrolytic cell in order to execute an operation therein without requiring intervention by the electrolysis service machine and without requiring circulation in the passageways adjacent to the electrolytic cells.

Superstructure refers to the structure supporting the anode frame and any fixed element of the electrolytic cell attached thereto, such as, for example, means for extracting cell gases and devices for supplying alumina. This superstructure comprises, for example, a beam extending above the pot shell in a longitudinal direction of the cell and supported by feet disposed at the transverse edges of the pot shell. The superstructure, upon which the displacement means are bearing, supports these displacement means and the handling device.

The handling device therefore makes it possible in particular to make the same intervention tool available to several anode assemblies positioned at regular intervals along the superstructure of the electrolytic cell, thereby reducing costs.

Also, according to one embodiment, the intervention tool is a device that makes it possible to reposition an anode assembly of the electrolytic cell.

Repositioning means adjusting the height of the anode of the anode assembly so that its lower surface is in a determined position.

A handling device provided with such an intervention tool therefore offers the possibility of regularly repositioning of anode assemblies on an individualized basis and also increases the availability of electrolysis service machines for other operations, also reducing the costs of exploitation.

According to one embodiment, the handling device comprises lifting means configured to raise or lower the intervention tool between a parking position, making it possible to keep the intervention tool at a distance from the electrolytic cell, and a working position, making it possible to lower the intervention tool in contact with the electrolytic cell.

These lifting means may consist of jacks or articulated arms but, according to one embodiment of the invention, the lifting means are cable lifting means.

Cable lifting means refers to any lifting means comprising a long and flexible element designed to lower or tow a load from above such as a cable, tether, strap, rope, chain, or equivalent.

The use of cable lifting means, in essence simple, reliable and inexpensive, is made advantageous due to the positioning of the chassis above the superstructure, that is to say, above an intervention area of the intervention tool.

According to one embodiment, the lifting means comprise a motorized hoist or winch.

According to one embodiment, the lifting means comprise means for detecting the arrival of the intervention tool in the working position.

The height at which the intervention tool is in the working position depends on the height of the anode frame which varies over time. Therefore, halting the lowering of the intervention tool can be controlled when the intervention tool comes into contact and bears on the anode frame or a cell element, fixed with respect to the anode frame, such as the connector, the connector axis, or the hook formed on the anode frame to support the connector. The detection means may be of the contact sensor or optical sensor type.

According to one embodiment, the handling device comprises guide means configured to guide the intervention tool according to a predetermined path from the parking position to the working position.

This feature allows to bring the intervention tool to an intervention zone precisely.

According to one embodiment, the guide means comprise two parallel flanges between which the intervention tool extends in the parking position, each flange comprising a groove designed to receive and guide an element attached to the intervention tool.

These flanges ensure robust and efficient guidance, preventing any tilting or unsuitable backlash.

According to one embodiment, the handling device comprises a retaining member designed to prevent the chassis carrying the intervention tool from tilting on either side of the superstructure. This allows lowering or raising the intervention tool in a secure manner.

According to one embodiment, the handling device carries two intervention tools arranged on opposite sides of the chassis.

This makes it possible to balance the masses at the handling device, and to have two intervention tools available per electrolytic cell, each intervention tool being designed to intervene on one half of the electrolytic cell. Therefore, the operating efficiency of the electrolytic cell and the aluminum smelter is improved.

Alternatively, the handling device carries a single intervention tool arranged on a rotary platform positioned on the chassis.

Thus, the same tool can advantageously operate on both sides of the electrolytic cell.

According to one embodiment, the displacement means allow the displacement of the chassis along the superstructure of the electrolytic cell.

According to one embodiment, the chassis moves above the superstructure.

According to a second aspect, the subject-matter of the invention is an intervention device on an electrolytic cell comprising a handling device with the aforementioned features and the intervention tool, the intervention tool comprising a mount provided with one or more support surfaces allowing the intervention tool to rest upon and to be stably supported directly upon at least one element of the electrolytic cell in the working position.

This feature makes it possible for the electrolytic cell to be the one supporting the weight of the intervention tool when the intervention tool is in the working position and, in particular, during the intervention on the cell. There is a transfer of the intervention tool's weight from the handling device to at least one element of the electrolytic cell when the intervention tool arrives in the working position and rests upon this cell element. Thus, the handling device does not undergo mechanical force from the intervention tool when the latter is in the working position and during intervention on the cell. The handling device therefore does not need to be sized to withstand significant mechanical stresses, which reduces the associated design and handling costs. Also, there is no risk for the handling device to tilt when the tool is in the working position and in particular during intervention on the cell.

According to one embodiment, the mount of the intervention tool comprises reversible fixing means adapted to create a reversible attachment between the mount and at least one element of the electrolytic cell. Thus, when the intervention tool is in a working position, bearing on at least one element of the cell, the intervention tool can also be attached to at least one element of the cell to further improve the stability of the intervention tool on the cell and increase the stress levels that the intervention tool may undergo during the intervention on the cell.

According to one embodiment, the intervention tool comprises a movable part relative to the mount, a displacement means for moving the movable part in translation relative to the mount, the movable part comprising the engagement means configured to engage a rod anode of an anode assembly of the electrolytic cell in order to secure in translation the anode rod and the movable part of the intervention tool.

These features allow the intervention tool to reposition an anode assembly for which a possible optimization of the vertical positioning has been detected, that is to say, an individualized displacement of an anode assembly, in particular in order to reposition its lower surface in the anode plane. The movable part may be moved with the anode assembly in vertical translation, up or down with respect to the mount, based on the desired positioning of the anode assembly.

Such an intervention tool that can be moved along the superstructure by means of the handling device facing each of the anode assemblies of the cell allows, if necessary, to reposition one after the other individually all the anode assemblies of the cell. The engagement means, for securing the anode rod and the movable part of the intervention tool in translation, include conventional gripping means such as pliers or a vise gripping the anode rod between two opposite jaw members.

According to one embodiment, the intervention tool comprises a tightening/loosening means suitable for tightening/loosening a connector holding the anode assembly in position within the electrolytic cell.

These tightening/loosening means are advantageously a screwdriver engaging a threaded rod of the connector when the intervention tool is positioned in a working position.

According to a third aspect, the subject-matter of the invention is an electrolytic cell comprising a superstructure, an anode frame supported by the superstructure and a handling device having the aforementioned features, in which the superstructure comprises a surface upon which the displacement means are bearing.

Thus, the handling device, designed to transport an intervention tool, moves on the electrolytic cell instead of moving in the aisles serving the electrolytic cells. This reduces congestion in the potroom and improves safety.

All the electrolytic cells of an aluminum smelter can be equipped with a handling device allowing the movement of an intervention tool and therefore interventions in different areas in each electrolytic cell without generating a detrimental congestion in the work aisles adjacent to the electrolytic cells, or mobilizing an electrolysis service machine.

According to one embodiment, the surface upon which the displacement means are bearing is an upper surface of the superstructure.

This embodiment is the simplest since the superstructure typically has an upper surface extending over the entire length of the electrolytic cell.

According to one embodiment, the superstructure and/or the displacement means form a path of displacement for the chassis over at least the entire length of the anode frame.

Thus, the intervention tool, carried by the handling device, can be moved and brought into position for intervention near all the anode assemblies supported by the anode frame.

According to one embodiment, the displacement path presents a storage track at one end of the electrolytic cell.

This allows the handling device to clear the space above the anode frame, for example, for the passage or intervention of an electrolysis service machine.

According to one embodiment, the displacement means comprise guide means designed to guide the chassis in translation in a longitudinal direction of the electrolytic cell.

These guide means ensure precise positioning of the handling device on the superstructure and may, in particular, be rails forming the displacement path and cooperating with wheels arranged on the chassis.

According to one embodiment, the displacement means comprise drive means configured to move the chassis along the superstructure.

The handling device can move autonomously on the superstructure of the electrolytic cell.

According to a fourth aspect, the invention relates to an aluminum smelter comprising at least one electrolytic cell having the aforementioned features.

According to a fifth aspect, the subject-matter of the invention is a method of intervention on an electrolytic cell having the aforementioned features, comprising the steps of:

- displacement of the chassis,
- displacement of the intervention tool from a parking position to a working position,
- performance of an intervention on the electrolytic cell using the intervention tool,
- displacement of the intervention tool from a work position to a parking position, According to a particular embodiment, the intervention on the electrolytic cell is a repositioning of an anode assembly and includes the following steps:

- engaging the intervention tool against an anode rod of the anode assembly to be repositioned,
- loosening an electrolytic cell connector to release the anode rod,
- displacing the anode assembly so that a lower surface of the anode assembly is brought to a predetermined position,
- tightening the connector,
- disengagement of the intervention tool and the anode rod,
- displacement of the intervention tool to the parking position.

Other features and advantages of the present invention will emerge clearly from the detailed description below of an embodiment, given by way of nonlimiting example, with reference to the appended drawings in which:

FIG. 1 is a sectional view of an electrolytic cell according to the prior art.

FIG. 2 is a view in perspective of a handling device in accordance with an embodiment of the invention, FIG. 3 is a side-view of a handling device and of an electrolytic cell in accordance with an embodiment of the invention.

FIG. 4 is a perspective view of a part of an electrolytic cell according to an embodiment of the invention, FIG. 5 is a view in perspective of a handling device in accordance with an embodiment of the invention, FIG. 6 is a view in perspective of a part of the handling device and of the electrolytic cell in accordance with an embodiment of the invention.

FIG. 7 is a side view of a part of an electrolytic cell according to an embodiment of the invention, FIG. 8 is a side-view of a handling device of a handling device in accordance with an embodiment of the invention, FIG. 9 is a side view of the intervention tool of FIG. 8 after a vertical displacement of a movable part, FIG. 10 is a view in perspective of part of an intervention tool of a handling device in accordance with an embodiment of the invention, FIG. 11 is a view in perspective of a handling device and of an electrolytic cell in accordance with an embodiment of the invention.

FIG. 12 is a view in perspective of a handling device and of an electrolytic cell in accordance with an embodiment of the invention.

FIG. 13 is a side-view of a handling device and of an electrolytic cell in accordance with an embodiment of the invention.

FIG. 14 is a top-view of a handling device and of an electrolytic cell in accordance with an embodiment of the invention.

FIG. 2 shows a handling device 1 on the electrolytic cell according to an embodiment of the invention. The handling device 1 is intended to transport one or more intervention tools 2 to jointly form an intervention device. Each intervention tool 2 is intended to carry out one or more operations on an electrolytic cell 3, for example a repositioning of an anode assembly as will be described in more detail below.

FIG. 3 shows that the handling device 1 is advantageously designed to transport two intervention tools 2. Where appropriate, each intervention tool 2 is designed to intervene on one half of the electrolytic cell 3.

With reference to FIGS. 2 and 3, the handling device 1 comprises a chassis 10, and displacement means for moving the chassis 10 along a superstructure 30 of the electrolytic cell 3.

The chassis 10 extends longitudinally along a transverse axis X, designed to extend parallel to a transverse direction of the electrolytic cell 3. The chassis 10 may take the form of a support plate or platform (FIG. 2), or even a beam (FIGS. 12 to 14).

When the handling device 1 carries two intervention tools 2, these two intervention tools 2 are advantageously positioned on opposite sides of the chassis 10 along the transverse axis X.

The displacement means support the chassis 10. The displacement means are configured to rest upon a surface 300, advantageously an upper surface, of the superstructure 30 and to allow a translation of the handling device 1 in a longitudinal direction of the electrolytic cell 3, along a displacement path delimited by the upper surface 300 of the superstructure 30.

With reference to FIGS. 2, 3, 5 and 12 to 14, the displacement means may comprise wheels or rollers 12 rotatably mounted on the chassis 10 around the transverse axis X. The displacement means may also include guide means, such as a rail 41 attached, for example, to the superstructure 30, designed to cooperate with the wheels or rollers 12.

The displacement means of the handling device 1 may comprise drive means, such as a motor which may be loaded on the chassis 10 to allow the handling device 1 to move along the superstructure 30, in the longitudinal direction Y of the electrolytic cell 3. Alternatively, as shown in FIG. 4, the displacement means may comprise a motor 42 arranged on the superstructure 30 and a transmission member 44, such as a chain actuated by the motor 42 and attached to the chassis 10. This motor 42 can be arranged at one end of the displacement path, for example at the level of the storage track 40.

With reference to FIG. 5, the chassis 10 advantageously comprises one or more retaining members 14 designed to prevent the handling device 1 from tilting on one side or the other of the superstructure 30. The retaining members 14 can be an L-shaped tab or hook intended to engage under a surface of the superstructure 30, for example under a rail head 41, to prevent vertical lifting of the chassis 10 of the handling device 1 relative to the superstructure 30.

The handling device 1 may include lifting means. The lifting means are configured to individually move the intervention tool(s) 2 between a parking position (FIGS. 2 and 3 on the right; FIG. 12; FIGS. 13 and 14 on the left), where the intervention tool 2 is at a distance from the electrolytic cell 3 to allow it to be conveyed along the electrolytic cell 3, and a working position (FIGS. 2 and 3 on the left; FIG. 6; FIGS. 13 and 14 on the right), where the intervention tool 2 is lowered in contact with the electrolytic cell 3 in order to carry out a predetermined operation, for example, an anode repositioning. In the parking position, the intervention tools 2 are near or in contact with the chassis 10. In the working position, the intervention tools 2 are distant from the chassis 10, at a greater distance from it than in the parking position.

With reference to FIGS. 2, 3, 6 and 12 to 14, the lifting means advantageously comprise, for each intervention tool 2, a winch 100 with a motor, for example, an electric motor, having a cable 102 designed to be connected to the intervention tool 2. The cable 102 may comprise a lifting beam 104. The means for lifting may also include one or more return pulleys 106 which can be arranged above a horizontal plane containing the chassis 10. For example, the pulleys 106 are rotatably mounted about a longitudinal Y axis on support arms 108 which extend from and above the chassis 10. The winch or winches 100 are advantageously positioned above the track defined by the displacement means, in the center of the chassis 10. Alternatively, the means for lifting can consist of jacks or articulated arms.

With reference to FIGS. 2, 3 and 6, the handling device 1 comprises, for each intervention tool 2, guide means configured to guide the intervention tool 2 according to a predetermined path, for example, an inverted L-shaped path, starting from the parking position towards the working position.

The guide means may include grooves 16 designed to receive and guide a rotary axis or roller 20 of the intervention tool 2. The grooves 16 may be formed on two parallel flanges 18 connected to the chassis 10 and defining between them a space designed to receive the intervention tool 2 in the parking position. Each groove 16 preferably comprises a lower portion 160, which advantageously extends along a vertical axis Z orthogonal to the longitudinal and transverse Y, X axes essentially under a horizontal plane containing or flush with the displacement means, and an upper portion 162, which extends obliquely with respect to the lower portion 160, at the height of or above a horizontal plane containing the chassis 10 or displacement means for the handling device 1. The upper portion 162 preferably extends externally from the vertical lower portion 160, that is to say away from the chassis 10 and the electrolytic cell 3. In the parking position, the rotary axis or roller 20 of the intervention tool 2 is located in the upper portion 162 of the groove, while in the working position, the rotary axis or roller 20 of the intervention tool 2 is located in the lower portion 160 of the groove. Preferably, each flange 18 comprises two similar and parallel grooves 16. These doubled grooves 16 prevent the intervention tool 2 from tilting around the rotary axis or roller 20 placed in the groove 16.

The handling device 1 may include means for supporting each intervention tool 2 in the parking position. Thus, the intervention tool 2 bears, at least in part, on these support means. The support means may be a side wall of the groove(s) 16 of the flanges 18.

The handling device 1 may comprise wired supply means, of the electric cable or pneumatic hose type, designed to supply the lifting means and/or a motor making it possible to move the handling device 1 on the superstructure 30, and an automatic reel designed for winding the wired supply means. Alternatively, or additionally, the handling device 1 may carry one or more energy storage units, such as batteries.

Each intervention tool 2 is connected to the handling device 1 via the cable 102 and the guide means described above.

With reference to FIG. 7, the intervention tool 2 comprises a mount 22 provided with one or more bearing surfaces 220 allowing the intervention tool 2 to bear and be stably supported directly on at least one element of the electrolytic cell 3 in the working position, more precisely on a fixed element relative to the anode frame 34, such as the connector 32, connector 32 pin 320, anode frame 34, hook 322 supporting the connector 32. For example, the mount 22 comprises a bearing surface 220*a* designed to bear against an upper face of the anode frame 34, and/or a bearing surface 220*b* designed to bear against a lateral face of the anode frame 34, and/or a bearing surface 220*c*, corresponding here to the bottom of a notch 222, designed to bear against the axis 320 of the connector 32. The bearing surface(s) 220 are configured to allow the intervention tool 2 to stably bear by gravity on the electrolytic cell 3 and be fully supported, if necessary, by the electrolytic cell 3.

The mount 22 may also include reversible fixing means designed for creating a reversible attachment between the mount 22 and at least one element of the electrolytic cell 3. The reversible fixing means may comprise one or more locking tabs, possibly movable with respect to the casing 22 between a retracted position and a deployed position, configured to cooperate with an element of the electrolytic cell 3 when the intervention tool 2 is in the working position, more precisely, with a fixed element with respect to the anode frame 34, such as connector 32, axis 320 of connector 32, anode frame 34, or hook 322 supporting the connector 32. The locking tab(s), with the bearing surface(s) 220, therefore make it possible to attach the intervention tool 2 to the electrolytic cell 3.

The intervention tool 2 is advantageously intended to perform a predetermined operation on the electrolytic cell 3, such as for example repositioning an anode. In this case, the intervention tool 2 may comprise engagement means allowing the gripping of an anode rod 36 of an anode assembly 38 of the electrolytic cell 3 and means for driving in translation of these gripping means, in order to vertically displace the anode assembly 38. More specifically, the intervention tool 2 comprises a movable part 24 in translation relative to the mount 22, this movable part 24 supporting the means of attachment, and driving means for driving the movable part 24 in translation along the vertical axis Z with respect to the mount 22. The movable part 24 and the mount 22 can be connected by a sliding guide 26. These features make it possible to move the anode assembly 38, by raising or lowering it, over a relatively short distance, of approximately 100 mm, but sufficient to replace the lower surface of the anode block of this anode assembly 38 at the desired location, for example in the anode plane.

With reference to FIG. 10, the engagement means may be gripping means making it possible to grip the anode rod 36 and comprising a vertical screw 200 with reverse pitch double threading, two cams 202, each engaged with one of the threads of the vertical screw 200 so that a rotation of the screw 200 brings the cams 202 closer or further apart, a pair of upper jaws 204 and a pair of lower jaws 206. Each upper jaw 204 is rotatably connected to one of the lower jaws 206. Each cam 202 is engaged in a lumen 208 of the upper or lower jaws 204, 206. Thus, bringing the cams 202 closer or further apart due to the rotation, in one direction or the other, of the threaded rod 200, causes a tightening or a widening of the upper and lower jaws 204, 206 in order to secure the movable part 24 of the intervention tool 2 with the anode rod 36.

With reference to FIGS. 8 and 9, the means for driving the movable part 24 with respect to the mount 22 may comprise one or more jacks 240, of the screw type, preferably trapezoidal, which can be actuated by an electric motor 242. In FIG. 8, the jack 240 is in the retracted position, while in FIG. 9, the jack 240 is in the deployed position. The position of the jack 240, before the step of engaging the anode rod 36 by the gripping means, may depend on the direction of the displacement necessary for repositioning the anode assembly 38, namely lifting or lowering of the anode assembly 38.

With reference to FIG. 2 or 3, the intervention tool 2 advantageously comprises means for tightening/loosening a connector 32 of an electrolytic cell 3. The connector 32 may be the type which comprises rotary levers actuated by a threaded rod 324, as disclosed in patent document WO2013159218. The tightening/loosening means of the intervention tool 2 may comprise a screwdriver 28 intended to engage and pivot the threaded rod 324 of connector 32 in one direction or the other, in order to loosen or tighten the grip exerted by the connector 32 and the anode frame 34 on the anode rod 36. The tightening/loosening means are provided on the mount 22 to engage the tightening/loosening means of the intervention tool 2 with the corresponding components of the connector 32 when positioning the intervention tool 2 in a working position, and to maintain this engagement during the intervention, and, in particular, when the movable part 24 of the intervention tool 2 is displaced with respect to the mount 22.

The handling device 1, and, more particularly, the lifting means, advantageously comprises detection means, such as, for example, a contact or optical sensor 11, shown diagrammatically in FIGS. 8 and 9, making it possible to ensure the positioning of the intervention tool 2 in a working and/or parking position.

Furthermore, the intervention tool 2 may comprise wired supply means, of the electric cable or pneumatic hose type, designed, in particular, to supply the drive, engagement and/or tightening/loosening means of the intervention tool 2, and an automatic reel designed for winding the wired supply means. Alternatively, or in addition, the intervention tool 2 may carry one or more energy storage units, such as batteries.

The invention also relates to an electrolytic cell 3 comprising a superstructure 30, an anode frame 34 supported by the superstructure 30, an anode assembly 38, a connector 32 for removably suspending the anode assembly 38 from the anode frame 34, and a handling device 1 as described above, the handling device 1 being able to carry one or more intervention tools 2.

With reference to FIGS. 3, 7, 12, the superstructure 30 has a surface 300, in particular an upper surface, upon which the displacement means are bearing. The superstructure 30 and/or the displacement means form a displacement path of the chassis 10 of the handling device 1 over at least the entire length of the anode frame 34, or a pot shell of the electrolytic cell 3. The surface 300 extends in a horizontal plane XY. The displacement path is advantageously rectilinear, positioned in the center of the electrolytic cell 3, symmetrical with respect to the median plane YZ of the electrolytic cell 3.

The displacement path may extend beyond a vertical projection of the anode frame 34 or the pot shell of the electrolytic cell 3. In particular, as illustrated in FIG. 11, the displacement path may comprise a storage track 40 to store the handling device 1, for example, in the absence of intervention, or to free up space above the electrolytic cell 3 for the passage or intervention of an electrolysis service machine. The storage track 40 is located at one end of the displacement path and the electrolytic cell 3, for example, in a cantilever manner. Although not shown, the storage track 40 may extend in a horizontal plane which is below the plane containing the surface 300 of the superstructure 30, in order to free up more space above the electrolytic cell 3.

If necessary, the positioning of the handling device 1 on the storage track 40 can allow recharging electrical batteries of different equipment, such as the displacement means, lifting means and/or intervention tool 2.

It will be noted that the electrolytic cell 3 or the handling device 1 may advantageously include means for controlling the position of the handling device 1, such as an encoder installed in the motor 42 designed to drive the handling device 1, as well as a sensor for both the zero point, for example, a first end of the displacement path such as the storage track 40, and the end of travel, such as a second opposite end of the displacement path.

Alternatively, markings and associated detectors may make it possible to precisely determine the stops of the chassis 10 facing the anode assemblies 38, whose positions always remain the same and are at regular intervals, as shown in FIG. 14.

In addition, although not shown, the electrolytic cell 3, the handling device 1 or the intervention tool 2 may be equipped with wired or wireless communication means, known to the person skilled in the art, for communicating with a control unit provided within the aluminum smelter and designed to control the displacements and operations of the handling device 1 and the intervention tool 2.

The invention also relates to an aluminum smelter comprising a plurality of electrolytic cells 3 including at least one electrolytic cell 3 as described above. Preferably, all of the aluminum smelter electrolytic cells 3 have the above features. The smelter may include one or more electrolysis service machines intended to move above the handling devices 1 present on the displacement path of the superstructure 30.

Furthermore, the aluminum smelter or the electrolytic cell(s) 3 advantageously comprises means for measuring the current flowing in each of the anode assemblies 38, such as, for example, Hall effect sensors, as disclosed in U.S. Pat. No. 6,136,177.

The aluminum smelter may include a control unit designed to control the displacements and operations of the handling devices 1, and intervention tools 2 based on the results of the measurements of the current circulating in each of the anode assemblies 38, and based on information received about the positioning and operations of the handling devices 1 and/or the intervention tools 2 and/or the electrolysis service machines.

The invention finally relates to an intervention method on an electrolytic cell 3 as previously described. This method includes the steps of:

- displacement of the chassis 10 on the superstructure 30,
- displacement of the intervention tool 2 from a parked position to a working position,
- carrying out the intervention on the electrolytic cell 3 using the intervention tool 2,
- displacement of the intervention tool 2 from a work position to a parked position, The method may include an initial step of measuring an operating parameter of the cell, such as the intensity of the current circulating in each of the anode assemblies 38.

The lowering of the intervention tool 2 down to the working position may include the bearing of the intervention tool 2 on an element of the electrolytic cell 3, more precisely, a fixed element with respect to the anode frame 34, such as the connector 32, the axis 320 of the connector 32, the anode frame 34, or the hook 322 supporting the connector 32.

The lowering of the intervention tool 2 down to the working position may be followed by a step of attaching the intervention tool 2 to the electrolytic cell 3 in the working position, more precisely, on an element of the electrolytic cell 3 fixed with respect to the anode frame 34, such as the connector 32, the axis 320 of the connector 32, the anode frame 34, or the hook 322 supporting the connector 32.

Preferably, the step of carrying out the intervention by means of the intervention tool 2 consists in repositioning an anode assembly, for example, the displacement of an anode assembly 38 in order to reposition the lower face of the anode block in the anode reference plane. Repositioning an anode assembly can include the following steps:

- displacement of the chassis 10 on the superstructure 30 so that it faces the anode assembly 38 to be repositioned,
- displacing the intervention tool 2 from a parking position to a working position,
- engaging the intervention tool 2 against an anode rod 36 of the anode assembly 38 to be repositioned, for example, gripping of the anode rod 36 by the intervention tool 2,
- loosening a connector 32 of the electrolytic cell 3 to release the anode rod 36,
- displacing the anode assembly 38 so that a lower face of the anode block of the anode assembly 38 is brought to a predetermined position,
- tightening the connector 32,
- disengaging the intervention tool 2 and the anode rod 36,
- moving the intervention tool 2 into a parking position.

Advantageously, the loosening step of the connector 32 is a partial loosening step so that the connector 32 maintains contact between the anode rod 36 and the anode frame 34. The tightening and loosening of the connector 32 are advantageously carried out by the tightening/loosening means of the intervention tool 2.

The method may also include the communication of information or control signals between the control unit of the aluminum smelter and the handling devices 1 and/or the intervention tools 2 and/or the electrolysis service machines in order to control their respective displacements and operations.

Obviously, the invention is in no way limited to the embodiment described above, this embodiment having been given only by way of example. Modifications are possible, in particular in terms of the composition of the various devices, or by substitution of technical equivalents, without thereby departing from the scope of protection of the invention.

The invention claimed is:

1. Handling device to be used to convey an intervention tool configured to perform an intervention on an electrolytic cell having a superstructure, the handling device comprising:

- a chassis carrying the intervention tool and movable above the superstructure; and a displacement means adapted to allow movement of the chassis wherein the displacement means support the chassis and are adapted to rest against the superstructure.

2. Handling device according to claim 1, wherein the handling device comprises lifting means configured to raise or lower the intervention tool between a rest position making it possible to keep the intervention tool away from the electrolysis cell and a working position making it possible to lower the intervention tool to be in contact with the electrolytic cell.

3. Handling device according to claim 2, wherein the lifting means are cable lifting means.

4. Handling device according to claim 2, wherein the lifting means comprise a motorized hoist or winch.

5. Handling device according to claim 2, wherein the lifting means comprise means for detecting the arrival of the intervention tool in the working position.

6. Handling device according to claim 2, further comprising guide means configured to guide the intervention tool according to a predetermined path from the rest position to the working position.

7. Handling device according to claim 6, wherein the guide means comprises two parallel flanges between which the intervention tool extends into the rest position, each flange comprising a groove designed to receive and guide an element attached to the intervention tool.

8. Handling device according to claim 1, wherein the handling device comprises a retaining member designed to prevent the chassis carrying the intervention tool from tipping from one side or the other of the superstructure.

9. Handling device according to claim 1, wherein the handling device is configured to carry two intervention tools arranged on opposite sides of the chassis.

10. Handling device according to claim 1, wherein the handling device carries a single intervention tool arranged on a rotary platform positioned on the chassis.

11. Handling device according to claim 1, wherein the displacement means allow the displacement of the chassis along the superstructure of the electrolytic cell.

12. Intervention device on an electrolytic cell having a superstructure, the intervention device comprising:

an intervention tool having a mount provided with one or more bearing surfaces allowing the intervention tool to bear and to be stably supported directly upon at least one element of the electrolytic cell in a working position; and a handling device having a chassis carrying the intervention tool and movable above the superstructure of the electrolytic cell, and displacement means configured to allow movement of the chassis, wherein the displacement means support the chassis and are configured to rest against the superstructure.

13. Intervention device according to claim 12, in which the mount of the intervention tool comprises a reversible attachment means adapted to establish a reversible attachment between the mount and the at least one element of the electrolysis cell.

14. Intervention device Handling device according to claim 12, in which the intervention tool comprises a part that is movable relative to the mount, displacement means for moving the movable part in translation relative to the mount, the movable part comprising engagement means configured to engage an anode rod of an anode assembly of the electrolytic cell in order to secure in translation the anode rod and the movable part of the intervention tool.

15. Intervention device Handling device according to claim 14, wherein the intervention tool comprises tightening/loosening means suitable for tightening/loosening a connector holding the anode assembly in position within the electrolytic cell.

16. An electrolytic cell comprising:

a superstructure an anode frame supported by the superstructure; and an intervention device comprising:

an intervention tool having a mount provided with one or more bearing surfaces allowing the intervention tool to bear and to be stably supported directly upon at least one element of the electrolytic cell in a working position; and a handling device having a chassis carrying the intervention tool and movable above the superstructure of the electrolytic cell, and displacement means configured to allow movement of the chassis, wherein the displacement means support the chassis and are configured to rest against the superstructure, and wherein the superstructure comprises a surface upon which the displacement means are bearing.

17. Electrolytic cell according to claim 16, wherein the surface upon which the means of displacement rests is an upper surface of the superstructure.

18. Electrolytic cell according to claim 16, wherein the superstructure and/or the displacement means form a path of displacement for the chassis over at least the entire length of the anode frame.

19. Electrolytic cell according to claim 18, wherein the displacement path has a storage track at one end of the electrolytic cell.

20. Electrolytic cell according to claim 16, wherein the displacement means comprise guide means designed to guide the chassis in translation in a longitudinal direction of the electrolytic cell.

21. Electrolytic cell according to claim 20, wherein the displacement means comprise drive means configured to move the chassis along the superstructure.

* * * * *